United States Patent [19]
Wiggins et al.

[11] 3,930,006
[45] Dec. 30, 1975

[54] ANTIPARKINSONISM COMPOSITIONS AND METHOD

[75] Inventors: Leslie Frederick Wiggins, Wargrave; John William James, Langley; Maurice Ward Gittos, Slough, all of England

[73] Assignee: Aspro-Nicholas Limited, Slough Bucks, England

[22] Filed: July 22, 1965

[21] Appl. No.: 510,108

Related U.S. Application Data

[60] Division of Ser. No. 276,977, April 30, 1963, abandoned, which is a continuation-in-part of Ser. No. 75,911, Dec. 15, 1960, abandoned.

[52] U.S. Cl. ............... 424/254; 424/248; 424/250; 424/267; 424/274
[51] Int. Cl.² ............... A61K 31/40; A61K 31/445; A61K 31/495; A61K 31/515; A61K 31/535
[58] Field of Search ........ 167/65 AC, 65 MU, 65 P; 260/260, 257, 256.4; 424/254, 248, 250, 207, 274

[56] References Cited
UNITED STATES PATENTS

| | | | |
|---|---|---|---|
| 2,786,057 | 3/1957 | Bruce | 260/257 |
| 2,876,225 | 3/1959 | Donnison | 260/257 |
| 3,268,530 | 8/1966 | Engle | 167/65 P |

OTHER PUBLICATIONS

Guidicelli et al., *anorales Pharm. Francaises* 15, pp. 533–546 (1957).

Journal American Pharmaceutic Association, 42, pp. 720–721 (1953).

*Primary Examiner*—Stanley J. Friedman

[57] ABSTRACT

A method is provided for ameliorating symptoms of paralysis agitans by administering to a subject exhibiting this syndrome an effective dose of a compound having anti-Parkinsonism activity, and having the general structure

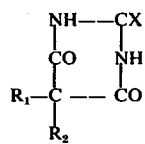

and pharmaceutically acceptable salts thereof.

20 Claims, No Drawings

ANTIPARKINSONISM COMPOSITIONS AND METHOD

This application is a division of Ser. No. 276,977, filed Apr. 30, 1963, now abandoned, which, in turn is a continuation-in-part of Ser. No. 75,911, filed Dec. 15, 1960, and now abandoned. The subject matter of Ser. No. 276,977 is carried forward in Ser. No. 526,707, filed Feb. 11, 1966, now U.S. Pat. No. 3,857,844, patented Dec. 31, 1974. Related subject matter is covered in Ser. No. 277,431, filed May 2, 1963, now U.S. Pat. No. 3,312,703, patented Apr. 4, 1967.

This invention relates to the treatment of paralysis agitans (or Parkinson's Disease) by chemotherapeutic means. More particularly it relates to a new method of treating paralysis agitans by the administration of certain special barbituric acid derivatives which had not been made prior to our invention. The invention also provides pharmaceutical compositions containing such derivatives, which may be used in the treatment of paralysis agitans, and furthermore provides novel barbituric acid derivatives which may be used in accordance with the invention.

Paralysis agitans is a condition, usually of late middle-life, characterised by a mask-like facies, muscular rigidity of the limbs with a coarse tremor of the hands or fingers of a pill-rolling type, a festinant gait and a general clumsiness of muscular movement. It is usually attributable to degenerative changes in the corpus striatum, but the syndrome of paralysis agitans is also exhibited by many patients treated with certain drugs of the tranquillising class, especially reserpine and some drugs of the phenothiazine group such as chlorpromazine. In the case of patients having this drug-induced paralysis agitans or Parkinsonism, as it has been called, it is the practice, where it is not practicable to withdraw treatment with the causative drug, to give concurrently with it a drug evincing anti-Parkinsonism activity. There is no specific treatment for the condition, whether natural or drug-induced (apart from withdrawal of the causative agent in the latter case where practicable), and drug therapy merely attempts to reduce the rigidity and to some extent the tremor. Reduction of salivation and sweating is a further aim of such therapy.

Atropine, in particular, has been much used with the latter object particularly in mind, but suffers from a number of disadvantages, particularly in having certain undesirable side effects in man, including mydriasis, blurring of the vision and dryness of the mouth and retention of urine.

A number of the more recently introduced anti-Parkinsonism drugs have several parasympatholytic actions which may cause undesirable side-effects in man, similar to those produced by atropine. Among the more important of these drugs are tricyclamol (Kemadrin, 1-cyclohexyl-1-phenyl-3-(1-pyrrolidinyl)-1-propanol) and aturban (2-(2-diethylaminoethyl)-2-phenylglutarimide). A desirable advance over existing anti-Parkinsonism drugs, such as these, would consist in the provision of a drug whose atropine-like side effects are reduced in relation to its specific anti-Parkinsonism effect, so that at therapeutic levels of dosage relatively little or no peripheral parasympatholytic side effects are evinced.

By our invention, we have provided a class of compounds which have anti-Parkinsonism activity and which may be used for ameliorating symptoms of paralysis agitans, by which term we mean to refer herein to the symptoms of Parkinson's disease, whether spontaneous or drug-induced. Our invention includes a method of ameliorating paralysis agitans comprising administering to a subject exhibiting the syndrome thereof an effective dose of one of the compounds provided by this invention. Usually the compound will be given in the form of a pharmaceutical composition comprising a pharmaceutical carrier and the novel drug and our invention also provides such pharmaceutical compositions, as will become more readily apparent hereinafter.

None of the anti-Parkinsonism compounds provided by our invention had ever been made prior to our invention, so far as we have been able to ascertain from the published literature, although it is true to say that the prior art does contain one publication wherein reference is made to the structure of two or three of the compounds and to the inability of the authors to make those compounds (Giudicelli et al., Annales Pharm. Francaises, Vol. 15, 1957, pp. 533–546). We show hereinafter how such compounds may be obtained in novel fashion, in accordance with a further invention of ours.

The compounds envisaged in accordance with our invention are barbituric acid derivatives, including 2-thiobarbituric acid derivatives, which either accord with the structural formula:

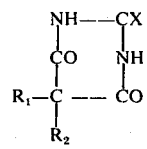

wherein the symbols X, $R_1$ and $R_2$ have the meanings hereinafter defined, or are pharmaceutically acceptable salts of compounds having that formula, whether metallic salts, for example a sodium salt, or acid addition salts, for example a hydrohalide salt. In the structural formula, X represents oxygen or sulphur:

$R_1$ has the following meanings:

A.

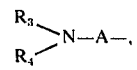

wherein $R_3$ represents a lower alkyl group, advantageously methyl or ethyl, $R_4$ represents a lower alkyl group, advantageously methyl or ethyl, and A represents a straight-chain alkylene radical containing either 2 or 3 chain carbon atoms, which alkylene radical may optionally be substituted by one or more methyl groups;

B. B⌒N — A —, wherein B⌒N — represents a saturated heterocyclic group, which may optionally contain a further hetero atom such as nitrogen or, preferably, oxygen (examples of such heterocyclic groups, which advantageously have from 5 to 7 ring atoms, being pyrrolidyl, piperidyl, morpholino, piperazino and homopiperazino), and A represents a straight-chain alkylene radical containing either 2 or 3 chain carbon atoms, which alkylene radical may optionally be substituted by one or more methyl groups; and C. $R_5 — (CH_2)_n —$, wherein $n$ represents 1 or 2 and $R_5$ is a saturated heterocyclic group containing a basic nitrogen atom which is spaced away from the adjacent carbonyl groups in the barbituric acid ring by 3, 4 or 5 carbon atoms, which basic ring nitrogen atom may be unsubstituted or may bear a lower alkyl, preferably methyl, substituent; and $R_2$ has different meanings, depending on whether X represents oxygen or sulphur, the meaning of $R_2$ when X is oxygen being:

D. a phenyl group, which may be substituted by one or more halogen, hydroxy, lower alkyl (preferably methyl) or lower alkoxy (preferably methoxy) substituents, any substitution preferably being in the meta-position:

and $R_2$ meaning when X is sulphur:

E. a phenyl group, which may be substituted as described and defined in (D), cyclohexyl, benzyl or a straight or branched alkyl chain containing from 3 to 7 (preferably 4 or 5) carbon atoms, for example a propyl, butyl, amyl, hexyl or heptyl group, advantageously n-butyl or ace-amyl.

Within the class of compounds defined above there is a preferred class wherein:

X is sulphur or oxygen;
$R_1$ means:
A.

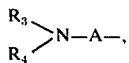

wherein $R_3$ is methyl or ethyl, $R_4$ is methyl or ethyl and A is 2-ethyl or 3-propyl;

B. $B \colon N — A —$, wherein $B \colon N —$ is a saturated heterocyclic ring and A is 2-ethyl or 3-propyl; or (C) 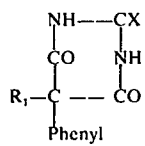

wherein $R_6$ is hydrogen or methyl; and
$R_2$ means phenyl.

Within this preferred class of compounds there is a particularly preferred class consisting of compounds having the formula:

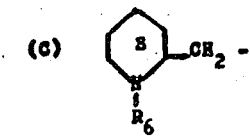

and pharmaceutically acceptable salts thereof, wherein X is oxygen or sulphur and $R_1$ is 2-diethylaminoethyl, 2-piperidinylmethyl or N-methyl-2-piperidinylmethyl.

We use the terms "lower alkyl" and "lower alkoxy" herein to designate respectively alkyl and alkoxy groups containing from 1 to 4 carbon atoms.

A recognised screening test for compounds to be useful in the treatment of the symptoms of paralysis agitans in animals, particularly man, is the test for the suppression of tremorine-induced spasms in mice. The administration of tremorine to laboratory animals produces spasms and it has been found experimentally that drugs which are effective in relieving Parkinsonian tremor and rigidity in man are capable of reducing tremorine-induced tremor in mice (Ahmed and Marshall, Brit. J. Pharmacol., 18, 247 (1962)). The test is carried out as follows: Varying dose levels of the test compound are administered intraperitoneally to groups of mice at the same time as 30 mg./kg. of tremorine. Groups of five mice per dose level are used in a randomised manner and each test includes a group receiving tremorine and saline as a control. Thirty minutes after the injection the degree of tremor, if any, is observed and given a score. The approximate dose levels which give a 90% protection, or alternatively a 50% protection, against the tremorine-induced spasms are then estimated from these scores.

We give hereinafter the results obtained by this screening test as applied to a large and representative selection of the compounds envisaged according to our invention, by way of illustration of the breadth and applicability thereof, together with an evaluation of their acute toxicity in animals. At the same time, many of the envisaged compounds have been examined with a view to evaluating their relating freedom or otherwise at effective dose levels from undesired atropine-like side effects, as described above, occasioned by peripheral parasympatholytic activity.

Two tests are employed to assess the peripheral parasympatholytic activity of potential anti-Parkinsonism drugs, namely a test for mydriatic activity as observed in the mouse eye and a test for spasmolytic effect on the isolated guinea pig ileum. Compounds possessing appreciable mydriatic activity in mice (as evidenced by an increase in the diameter of the pupil on administration) at dose levels required for anti-tremorine activity would be expected to show undesirable peripheral parasympatholytic side effects in man. Similar undesirable side effects would be expected from compounds showing high activity in the spasmolytic test. Thus a desirable compound would have high anti-tremorine activity and low mydriatic and spasmolytic activity in laboratory tests.

In the mydriatic test the pupil diameter of the test mice is measured 30 minutes after the intraperitoneal injection of the test compound, which is injected in an amount the same as that giving 90% protection (or 50% protection, as the case may be) in the anti-tremorine test. Pupil diameters are measured in terms of an arbitrary unit of length, the quantum of which is indicated by the fact that normal pupil size in the test mice is usually from 3 to 7 units, or an average of 5 units. A found mean pupil size of over 10 units after administration of the test drug to a group of about five mice is taken to indicate a marked mydriatis activity.

In the spasmolytic test the activity of the test compounds is determined in terms of the reduction which they cause in the acetylcholine-induced contraction or spasm of the isolated guinea pig ileum preparation maintained in a bath of oxygenated Tyrode solution. Contraction of the ileum preparation is first induced by the administration of a suitable dose of acetylcholine. The test compound is then added in serial concentration to the bath and a determination is made as to that concentration which causes a reduction by approximately 50% of the acetylcholine-induced contraction. A low concentration therefore indicates high activity.

We give below in Table A a summary of the results obtained by the foregoing tests as applied to certain important prior art anti-Parkinsonism drugs and as applied to a particularly preferred compound of our invention, namely 5-phenyl-5-(2'-piperidinylmethyl) barbituric acid hydrochloride (designated AGN 511).

when given in a dose of 100 mg/kg intraperitoneally to mice has a duration of approximately 3 to 4½ hours: a dose level of 300 mg/kg given orally exerts an anti-tremorine activity lasting in excess of 6 hours.

TABLE A

| Test compound | Toxicity, approx. $LD_{50}$ in mice, i.p. mg/kg | Anti-tremorine activity, dose giving c. 90% protection mg/kg | Mydriatic activity, mean pupil diameter units | Spasmolytic activity, concn. giving 50% reduction in contraction. |
|---|---|---|---|---|
| Atropine | 250 | 3 | 22 | $10^{-10}$ |
| Kemadrine | 150 | 10 | 15 | $10^{-9}$ |
| Aturban | 300 | 1 | 15.8 | $10^{-10}$ |
| AGN 511 | >512 | 30 | 3.6 | $>10^{-5}$ |

The low ratio of the mydriatic activity to the antitremorine activity for AGN 511 as compared with the like ratios for the prior art compounds points to the possibility of administering AGN 511 to a patient with the syndrome of paralysis agitans at a dose level to achieve an amelioration of symptoms comparable to that obtainable with the prior art compounds whilst largely or completely avoiding the atropine-like side effects thereof. A comparison of the figures for spasmolytic activity reveals the relative absence of spasmolytic activity in AGN 511 and supports the above-mentioned indications. The anti-tremorine activity of AGN 511

It has in fact been found that the administration of AGN 511 to patients with paralysis agitans or exhibiting Parkinsonian symptoms induced by the administration of phenothiazine drug has given symptomatic relief, and in one case a patient who was not controlled by 3-(1-piperidyl)-1-cyclohexyl-1-phenyl-1-propanol became controlled on a dosage of 100 mgms AGN 511 given three times daily.

Table B gives figures corresponding to those in Table A for a wide range of the barbituric acid derivatives encompassed by our invention:

TABLE B

| Ref. No. AGN | X | R₁ | R₂ | Toxicity approx. $LD_{50}$ in mice i.p. mg/kg | Anti-tremorine activity, dose giving 90% approx. protection mg/kg | Mydriatic activity mean pupil diameter units | Spasmolytic activity conc. giving 50% approx. reduction in contraction. |
|---|---|---|---|---|---|---|---|
| 117 | S | (CH₃)₂NCH₂CH₂— | CH₃CH₂CH₂CH(CH₃)— | 300 | 50 | 8.6° | $>10^{-4}$ |
| 128 | S | (CH₃)₂NCH₂CH₂— | CH₃(CH₂)₃— | 150 | 50 | 7.8° | $10^{-4}$ |
| 180 | S | (CH₃)₂NCH₂CH₂— | Phenyl | 300 | 12.5 | 12.6° | $10^{-5}$ |
| 217 | S | cyclohexyl-N-CH₂-CH₂- | CH₃CH₂CH₂CH(CH₃)— | >100 | 100 | 9.6° | $10^{-6}$ |
| 240 | O | (CH₃)₂NCH₂CH₂— | Phenyl | 600 | 200 | 15.8° | $10^{-5}$ |
| 406 | S | (C₂H₅)₂NCH₂CH₂— | Phenyl | 256 | 30 | 8.8 | $>10^{-5}$ |
| 407 | O | (C₂H₅)₂NCH₂CH₂— | Phenyl | 180 | 30 | 7.4 | $10^{-5}$ |
| 408 | S | cyclohexyl-CH(CH₃)-CH₂- | Phenyl | 350 | 30 | 8.6 | $10^{-5}$ |
| 436 | O | pyrrolidinyl-NCH₂CH₂- | Phenyl | >512 | 300 | 19.4 | $10^{-5}$ |
| 437 | S | piperidinyl-NCH₂CH₂- | Phenyl | 256 | 100 | 19.8 | $10^{-5}$ |
| 439 | S | piperidinyl-NCH₂CH₂- | Phenyl | 350 | 30 | 18.4 | $>10^{-5}$ |
| 442 | S | (CH₃)₂NCH₂CH₂— | m-Methoxyphenyl | 350 | 30 | 3.8 | $>10^{-5}$ |
| 443 | O | (CH₃)₂NCH₂CH₂— | m-Hydroxyphenyl | >512 | 300 | 13° | $>10^{-5}$ |
| 497 | O | cyclohexyl-NCH₂CH₂- | Phenyl | >512 | 300 | 8° | $>10^{-5}$ |

TABLE B-continued

| Ref. No. AGN | X | R₁ | R₂ | Toxicity approx. LD₅₀ in mice i.p. mg/kg | Anti-tremorine activity, dose giving 90% approx. protection mg/kg | Mydriatic activity mean pupil diameter units | Spasmolytic activity conc. giving 50% approx. reduction in contraction. |
|---|---|---|---|---|---|---|---|
| 499 | S | $(CH_3)_2N(CH_2)_3$— | Phenyl | >512 | 100 | 19 | $10^{-7}$ |
| 507 | S | $(CH_3)_2NCH_2CH_2$— | Cyclohexyl | 200 | 30 | 9° | >$10^{-5}$ |
| 511 | O | piperidinyl-CH₂— | Phenyl | >512 | 30 | 3.6 | >$10^{-5}$ |

| Ref. No. AGN | X | R₁ | R₂ | Toxicity approx. LD₅₀ in mice i.p. mg/kg | Anti-tremorine activity, dose giving 50% protection. mg/kg | Mydriatic activity mean pupil diameter units | Spasmolytic activity conc. giving 50% approx. reduction in contraction. |
|---|---|---|---|---|---|---|---|
| 193 | S | $(C_2H_5)_2CH_2CH_2$— | $CH_3CH_2CH_2CH(CH_3)$— | 300 | 100 | 15° | $10^{-5}$ |
| 438 | S | morpholinyl-CH₂CH₂— | Phenyl | 256 | 100 | 19 | >$10^{-5}$ |
| 440 | O | $(CH_3)_2NCH_2CH_2$— | m-Methoxyphenyl | >512 | 300 | 12.4° | >$10^{-5}$ |
| 441 | S | $(CH_3)_2NCH_2CH_2$— | m-Hydroxyphenyl | >512 | 100 | 9° | >$10^{-5}$ |
| 492 | O | $(CH_3)_2NCH_2CH(CH_3)$— | Phenyl | 300 | 100 | 8.4° | >$10^{-5}$ |
| 494 | O | $(CH_3)_2NCH(CH_3)CH_2$— | Phenyl | 180 | 100 | 12.6° | >$10^{-5}$ |
| 495 | S | $(CH_3)_2NCH(CH_3)CH_2$— | Phenyl | 16 | 10 | 9.2 | >$10^{-5}$ |
| 496 | O | $(CH_3)_2N(CH_2)_3$— | Phenyl | 300 | 100 | 14° | >$10^{-5}$ |
| 498 | O | morpholinyl-CH₂CH₂— | Phenyl | >512 | 300 | 12.4° | >$10^{-5}$ |
| 513 | O | N-methylpiperidinyl-CH₂— | Phenyl | 200 | 30 | 8.4 | $10^{-5}$ |

It will be observed that in Table B the figures given for anti-tremorine activity refer to 90% protection in the earlier part of the Table and to 50% protection in the latter part; this reflects the adoption of a changed standard for testing part way through the testing programme. It will also have been observed that an asterisk is shown against activity; but not all of the figures referring to mydriatic activity: the asterisk indicates that the result to which it refers was obtained by carrying out the mydriasis test during the anti-tremorine testing, that is to say whilst the test animals were under the influence of tremorine. Tremorine itself has a slight mydriatic activity and hence the figures indicated with an asterisk tend to over-emphasise any mydriatic activity which the test compound may have.

As has already been indicated, the compounds of our invention appear not to have been previously made by others; accordingly, some indication is given hereinafter as to how these compounds may be achieved. These barbituric acid derivatives may be made by a method which comprises condensing a chloroamine having the general formula $R_1Cl$, wherein $R_1$ has the same meaning as above, with a mono-substituted malonic ester having the general formula:

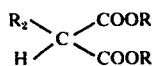

wherein $R_2$ has the same meaning as above and R is a lower alkyl group, preferably ethyl, the condensation preferably being carried out using sodium hydride in dioxan, to form a basic disubstituted malonic ester having the general formula:

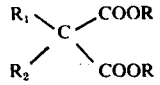

and thereafter condensing said basic disubstituted malonic ester with urea or thiourea, preferably using a solution of sodium in methanol or ethanol, to give the desired barbituric acid derivative, or one which may be converted by one or more subsequent reactions (as described below) to give the desired such derivative. The barbituric acid derivatives prepared in the above manner, (with or without further conversion as described below) may be converted to the corresponding non-toxic, pharmaceutically acceptable, acid addition salts, for example the water-soluble hydrochloride or hydrobromide, by treatment with the appropriate acid, or to metallic salts (such as a sodium salt), where such exist, by treatment with an appropriate base. Some of the acid addition salts crystallise in the form of their hydrates from water with, usually, one molecule of water of crystallisation.

In the particular case of the piperidinylmethyl barbituric acid derivatives of the invention, the 2-oxo derivatives may be prepared by effecting a catalytic reduction either of the corresponding pyridylmethyl malonic ester intermediate or of the corresponding pyridylmethyl barbituric acid derivative, using Adams' platinum oxide and hydrogen at atmospheric pressure and room temperature. For the 2-thio piperidinylmethyl derivatives, the pyridine ring has to be catalytically reduced with platinum and hydrogen at the malonic ester stage and the nitrogen atom in the piperidine ring has to be alkylated or otherwise protected before the barbituric acid condensation is carried out.

It will be appreciated that two stages are essentially involved in the above-described process for preparing barbituric acid derivatives when starting from a mono-substituted malonic ester, namely (a) amination of the mono-substituted malonic ester to give a basic disubstituted malonic ester, and (b) condensation of the disubstituted malonic ester with urea or thiourea to produce the basic barbituric acid derivative. Preferred methods of carrying out the two stages (a) and (b) will now be described in greater detail.

a. One mole of the appropriate mono-substituted malonic ester, for example the diethyl ester, is added in a thin stream to a continuously stirred suspension of one mole of finely powdered sodium hydride in dry dioxan. Vigorous evolution of hydrogen usually occurs at room temperature, but in some cases the sodium hydride suspension has to be warmed to 50°C. to start the reaction. The clear colourless solution of the sodium derivative of the malonic ester obtained in this manner is then warmed to 80°–90°C and one mole of the appropriate chloroamine (i.e. the aminoalkylating agent) is added dropwise over a half hour period. The resulting mixture is then stirred and refluxed for from 3 to 18 hours. The mixture, after being allowed to cool, is diluted with ether, washed with water and extracted with 2N hydrochloric acid. The oily base liberated on treating the acid extract with excess 5N sodium hydroxide is isolated by ether extraction. Fractional distillation of the ether extract yields the desired basic malonic ester. Alternatively, in the case of a heat labile base, it may be purified by the addition of ethereal hydrogen chloride, the precipitated hydrochloride being recrystallised.

b. Two preferred methods have been developed for this stage of the reaction. The first method has been found to have some limitations in that some of the basic malonic esters decompose with the loss of a carbalkoxy group at the temperature used for the condensation, explaining the inability of Giudicelli et al to make any of the few compounds of our type that they attempted to obtain. We have invented a second method which is therefore employed in these cases.

1. High Temperature Condensation

A mixture of the basic disubstituted malonic ester and urea or thiourea is added to a solution of sodium in anhydrous ethanol and the resulting mixture is refluxed for from 6 to 48 hours. The ethanol is distilled off under reduced pressure and the residue is dissolved in ice cold water. Any oil which separates at this stage is removed by ether extraction. The aqueous solution is then neutralised to a pH value of 8 by the dropwise addition of dilute acetic acid and the basic barbituric acid precipitated in this manner is filtered off or otherwise separated.

2. Low Temperature Condensation

This method of making a barbituric acid derivative essentially comprises the step of condensing thiourea with the basic disubstituted malonic ester in solution in an inert mutual solvent and in the presence of a condensation agent at a temperature up to 30°C until the reactants condense to a thiobarbituric acid derivative. This method should be used in the case of those basic disubstituted malonic esters which have the formula:

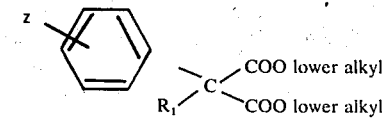

wherein $R_1$ represents:

A.

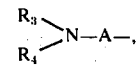

wherein $R_3$ represents a lower alkyl group, $R_4$ represents a lower alkyl group and A represents an unsubstituted or methyl-substituted straight-chain alkylene radical having 2 or 3 chain carbon atoms; or B. B  N —A —, wherein B  N — represents a heterocyclic group containing at least five ring atoms and A represents an unsubstituted or methyl-substituted straight-chain alkylene radical having 2 or 3 chain carbon atoms; or C. $R_5 —(CH_2)_n—$, wherein $n$ is 1 or 2 and $R_5$ represents 2-pyridyl or N-methyl-2-piperidinyl;

and Z represents hydrogen or at least one halogen, lower alkyl or lower alkoxy substituent, provided that when R represents a dimethylaminoalkyl group which is not substituted by methyl in the alpha position of the alkyl group, Z cannot represent hydrogen, but must be at least one halogen, lower alkyl or lower alkoxy substituent.

In the practice of this method, usually finely powdered thiourea is added to a cool solution of sodium in anhydrous methanol and the resulting mixture is stirred until the urea has nearly completely dissolved. The basic malonic ester is then added slowly and the mixture stirred at room temperature or below for a suitable time to carry out the reaction, for example from 1 to 30 days. The methanol is then evaporated off at room temperature using a rotary evaporator or equivalent equipment and the residue is then treated in the manner described in (1) above. Alternatively, the sodium methoxide solution can be added slowly to a stirred methanol solution of the basic malonic ester and thiourea at room temperature.

It has been found that yields of the 2-oxo -Thiobarbituric acid derivatives by the above methods (1) and (2) are sometimes rather low and indeed method (2) has been found to give only very low yields when urea is employed in place of thiourea. In those cases in which whichever one of methods (1) and (2) is appropriate to the particular malonic ester used gives an unsatisfactory yield, it is preferable to prepare a desired 2-oxo derivative by oxidation of the corresponding 2-thio derivative using an acidic oxidant such as, for example, aqueous nitric acid of a normality from 1 to 10 in the manner described below.

3. Conversion of 2-Thiobartituric Acids to the 2-oxo Analogues.

For example, the 2-thiobarbituric acid derivative is gently heated with 2.5 N or 5N nitric acid. The barbituric acid derivative passes into solution and a brisk evolution of nitrous fumes occurs. Addition of excess ammonia to the cooled solution precipitates the desired corresponding 2-oxobarbituric acid derivative.

On a larger scale, it is preferable to add the barbituric acid derivative slowly to boiling 2.5N nitric acid (8 mols) in the presence of powdered glass.

4. Conversion of 5-Alkoxyphenylbarbituric Acids to 5-Hydroxyphenyl Barbituric Acids.

Where a barbituric acid derivative (including a thiobarbituric acid derivative) having one or more hydroxy substituents on the 5-phenyl group is desired, it is preferred to make the corresponding 5-alkoxy (for example 5-methoxy) substituted barbituric or thiobarbituric acid compound from the corresponding malonic ester by the procedures described above and thereafter to hydrolyse the alkyl group from the alkoxy group by acid hydrolysis using, for example, a mixture of hydrobromic acid and glacial acetic acid.

In treating Parkinsonian symptoms (natural or drug-induced) with the described and defined barbituric acid derivatives, the amount of the derivatives actually to be administered will be determined in each case by the attending physician in the light of all relevant circumstances, and he will be guided by the skills of his art in prescribing an amount sufficient to obtain the optimal effect. Among the factors influencing the choice of dose is the choice of the particular derivative to administer and the choice of route of administration. The routes by which the derivatives may be given include the oral and rectal routes, and injection intramuscularly or intravenously. The dose will usually be between 1 to 500 mgm; between 1 and 250 mgm. in the case of injection and between 40 and 500 mgm in the case of oral administration. In the case of adult humans, the preferred ranges of dosage will be 40 to 120 mgm orally about three times daily, 20 to 60 mgm intramuscularly and 1 to 30 mgm intravenously.

The derivatives will normally be administered in the form of a pharmaceutical composition comprising the drug and a pharmaceutical carrier, conveniently in dosage unit form. Such formulations are an important part of our invention and we include within the limits of our invention formulations in which the carrier or sole carrier is not so much admixed with the drug as associated with it in the form, for example, of a capsule of gelatin or the like enclosing the drug; more normally, however, the drug within the capsule constituting a carrier will also be admixed with a further carrier or extender, such as lactose.

Our invention includes all appropriate dosage forms, especially unit dosage forms, including, as well as capsules, also for example tablets, sachets, elixirs, suspensions, suppositories, injection solutions and suspensions in physiologically acceptable media, and sterile packaged powders for making injection solutions, such as the pure sterile drug enclosed within a container (for example of glass). In the latter case the container, such as an ampoule, constitutes the pharmaceutical carrier, albeit it is not actually administered but is removed from association with the drug prior to administration of the drug, and is discarded.

To better illustrate the foregoing disclosure, reference is made to the following Examples. It will be seen that of Examples 1 to 29 illustrating the making of the compounds with which our invention is concerned, Examples 1 to 18 depend on the use of the low temperature malonic ester/thiourea condensation method which we have invented. That method is the subject of our copending application Ser. No. 277,431 filed May 2, 1963, which, like the present application, is also a continuation-in-part of our copending application Ser. No. 75,911, filed Dec. 15, 1960. Examples 30 to 41 illustrate pharmaceutical formulations in accordance with our invention, and reveal how the same may be made.

EXAMPLE 1

5-(N-methyl-2'piperidinylmethyl)-5-phenyl-2-thiobarbituric acid and its hydrochloride.

2-Phenyldiethylmalonate (79 g.) was stirred with sodium hydride (8.4 g.) in dry dioxan (200 mls.) until effervescence ceased. The resulting solution of the sodio derivative was then heated to 80°C and 2-pyridylmethyl chloride (43 g.) added dropwise with constant stirring over a half hour period. After the addition, the mixture was refluxed for 5 hours and then allowed to stand overnight. Water (200 mls.) was added and the resulting oil extracted with ether. Addition of ethereal hydrogen chloride to the dried ether extract precipitated 2(2'-pyridylmethyl)-2-phenyl-diethyl-malonate hydrochloride. Crystallisation from acetone-petroleum ether (40°–60°) gave needles of melting point 166°–168°C.

2(2'-Pyridylmethyl)-2-phenyl-diethyl-malonate hydrochloride (76 g.) prepared in the above manner was dissolved in ethanol (500 mls.) and 1 gram of Adams' platinum oxide was added. The mixture was then hydrogenated at room temperature and atmospheric pressure until hydrogen uptake ceased (3 mols.) The solution was filtered and evaporated to give crystals of 2(2'-piperidinylmethyl)-2-phenyl-diethyl-malonate hydrochloride. m.p. 174°–175°C.

A mixture of the 2(2'-piperidinylmethyl)-2-phenyl-diethyl-malonate hydrochloride (70.5 g.), water (102 mls) formic acid (16.8 mls.), sodium formate (21 g.), and formalin (25.2 mls., 37–41% w/v formaldehyde) was refluxed for 6 hours. The cool solution was made alkaline by the addition of 5N sodium hydroxide and extracted with ether. Distillation of the dried ether extract gave 2(N-methyl-2'-piperidinylmethyl)-2-phenyl-diethyl-malonate, b.p. 140°–147°C/0.15 mm.

Finely powdered dry thiourea (17.25 g) was added to a cool solution of sodium (5.13 g) in anhydrous methanol (125 ml) and the mixture stirred until the thiourea had almost all dissolved. 2(N-methyl-2'-piperidinylmethyl)-2-phenyl-diethyl-malonate (39 g) was then added dropwise with constant stirring during half an hour and the mixture finally stirred at room temperature overnight. The methanol was evaporated off under reduced pressure and the residue dissolved in ice-water (200 mls.). The oily layer was removed by ether extraction, the aqueous solution neutralised to pH8 by the addition of dilute acetic acid (5N), and the precipitated 5-(N-methyl-2'-piperidinylmethyl)-5-phenyl-2-thiobarbituric acid (m.p. 231°–232°Cdec.) filtered off.

A solution of the barbituric acid (3.5 g) in N hydrochloric acid (10 ml.) was evaporated to dryness and the product recrystallised from isopropanol to give 5-(N-methyl-2'-piperidinylmethyl)-5-phenyl-2-thiobarbituric acid hydrochloride, m.p. 216°–220°C dec.

Found: C, 55.40; H, 6.37; N, 11.01; Cl 10.1%. $C_{17}H_{22}N_3O_2SCl$. Requires: C, 55.49; H, 6.03; N, 11.42; Cl 9.64%. Recrystallisation from water afforded the monohydrate, m.p. 209°C.

EXAMPLE 2

5-(2'-Diethylaminoethyl)-5-phenyl-2-thiobarbituric acid and its hydrochloride

Finely powdered thiourea (15.2 g) was stirred with a cool solution of sodium (4.6g) in anhydrous ethanol (125 ml) until it had almost all dissolved. Diethyl 2-(2'-diethylaminoethyl)-2-phenylmalonate (33.5 g) was then added dropwise with constant stirring during half an hour and the mixture finally stirred at room temperature overnight. The ethanol was evaporated off using a rotary evaporator at a temperature which was not allowed to go above 45°C and the residue dissolved in ice water (100 ml). Any oil was removed by extraction with ether and the clear aqueous solution neutralised to pH8 by the addition of dilute acetic acid (5N). The precipitated 5-(2'-diethylaminoethyl)-5-phenyl-2-thiobarbituric acid (m.p. 215°C dec.) was dissolved in N-hydrochloric acid (1 equivalent), the solution evaporated and the residue recrystallised from acetone-ethanol to give prisms of 5-(2'-diethylaminoethyl)-5-phenyl-2-thiobarbituric acid hydrochloride, m.p. 234°—236°C. Crystals of the monohydrate (m.p. 238°C) are obtained on recrystallisation from water.

Found: C, 51.71; H, 6.59; N, 11.21; Cl, 9.47%. $C_{16}H_{22}N_3O_2SCl.H_2O$ requires: C, 51.4; H, 6.47; N, 11.22; Cl, 9.5%.

EXAMPLE 3

5-(2'-Diethylaminoethyl)-5-Phenylbarbituric Acid and its Hydrochloride 5-(2'-Diethylaminoethyl)-5-phenyl-2-thiobarbituric acid (4 g.) obtained in Example 2 was gently heated with 2.5 N nitric acid (50 mls.) until the evolution of nitrous fumes ceased. The mixture was then filtered hot, cooled and excess ammonia added. The precipitate was filtered off and recrystallised from hot water to give crystals of 5-(2'-diethylaminoethyl)-5-phenylbarbituric acid, m.p. 193°–194°C.

The barbituric acid was dissolved in an equivalent of N hydrochloric acid, the solution evaporated and the product recrystallised from water to give colourless prisms of 5-(2'-diethylaminoethyl)-5-phenylbarbituric acid hydrochloride, m.p. 275°C dec.

Found: C, 56.60; H, 6.64; N, 12.40; Cl, 10.34%. $C_{16}H_{22}N_3O_3Cl$. Requires: C, 56.56; H, 6.53; N, 12.37; Cl. 10.43%.

EXAMPLE 4

5-(2'-Piperidinylmethyl)-5-Phenylbarbituric Acid Hydrochloride and Intermediates An aqueous solution of 2(2'-pyridylmethyl-2-phenyl-diethyl-malonate hydrochloride (prepared as in Example 1) was treated with excess saturated aqueous potassium carbonate and the free base extracted with ether. Evaporation of the ether from the dried extract left a residue of the crude base.

A methanolic solution of the base (49.9 g) was slowly added to a stirred solution of sodium (7 g) and thiourea (23 g) in a 4:1 mixture of dry methanol (240 mls) and dry ethanol (60 mls) at room temperature, and the mixture was then stirred at room temperature for 1 week. The methanol and ethanol were then evaporated off under reduced pressure at room temperature and the residue dissolved in ice-water (150 ml). The small quantity of oil which separated at this stage was removed by ether extraction and the resulting aqueous solution neutralised to a pH value of 7 by the addition of dilute acetic acid. The precipitate of 5-(2'-pyridyl-methyl)-5-phenyl-2-thiobarbituric acid, m.p. 268°C (after recrystallisation from 2-ethoxyethanol) was isolated by filtration.

The 5-(2'-pyridylamethyl)-5-phenyl-2-thiobarbituric acid (42 g) was slowly added, with stirring, to a boiling solution of dilute nitric acid (2.5 N; 420 mls) containing powdered glass (50 g). After the evolution of nitrous fumes ceased, the mixture was filtered, cooled and excess ammonia added to precipitate crystals of 5-(2'-pyridylmethyl)-5-phenyl-barbituric acid, m.p. 320°C (after recrystallisation from 2-ethoxyethanol).

Found: C, 64.91; H, 4.43; N, 14.11% $C_{16}H_{13}N_3O_3$. Requires: C, 65.09; H, 4.44; N, 14.23%.

(When the experiment was repeated using dilute nitric acid (5N; 420 mls) instead of the 2.5N nitric acid, there was no significant difference in the yield of the 2-oxo-barbituric acid).

A mixture of the 5-(2'-pyridylmethyl)-5-phenyl-barbituric acid (10 g), glacial acetic acid (120 ml), concentrated hydrochloric acid(5 mls) and Adams' platinum oxide (0.5 g) was hydrogenated at room temperature and 5 atmospheres pressure until hydrogen uptake ceased (3 mols). The filtered solution was evaporated to dryness and the residue crystallised from water containing a few drops of dilute hydrochloric acid. The 5-(2'-piperidinylmethyl)-5-phenylbarbituric acid hydrochloride crystallised as the hydrate, m.p. 197°–199°C.

Found: C, 53.96; H, 6.08; N, 11.9; Cl, 9.93%. $C_{16}H_{20}N_3O_3Cl.H_2O$. Requires C, 54.0; H, 6.22; N, 11.8; Cl, 10.0%.

EXAMPLE 5

5-N-methyl-2'-Piperidinylmethyl)-5-Phenylbarbituric Acid Hydrochloride Hydrate.

A mixture of the 5-(2'-piperidinylmethyl)-5-phenylbarbituric acid hydrochloride (4.8 g) obtained in Example 4, water (7.5 ml), formic acid (1.3 ml), sodium formate (1.6 g) and formalin (1.9 ml.; 37–41% w/v formaldehyde) was refluxed for 6 hours. The pH of the cooled solution was adjusted to 9 by the addition of dilute sodium hydroxide and the mixture extracted with chloroform. Treatment of the dried chloroform extract with ethereal hydrogen chloride precipitated 5-(N-methyl-2'-piperidinyl-methyl)-5-phenylbarbituric acid hydrochloride hydrate. m.p. 195°–200°C. after recrystallisation from chloroform-ether.

Found: C, 51.80; H, 6.43; N, 10.5% $C_{17}H_{22}N_3O_2Cl.2H_2O$. Requires: C, 52.64; H, 6.76; N, 10.8%.

EXAMPLE 6

5-(2'-Dimethylaminoethyl)-5-M-Methoxyphenyl-2-Thiobarbituric Acid and its Hydrochloride Finely powdered dry thiourea (4.2 g) was stirred with a solution of sodium (1.7 g) in anhydrous ethanol (60 ml) at room temperature until it had almost all dissolved. Diethyl 2-(2'-dimethylaminoethyl)-2-m-methoxyphenylmalonate (12.5 g) was then added with stirring during half an hour and the mixture allowed to stand over the weekend. The ethanol was evaporated off using a rotary evaporator, the residue dissolved in ice cold water (50 ml) and the oil removed by ether extraction. Neutralisation of the aqueous solution to pH 8 with dilute acetic acid (5N) precipitated 5-(2'-dimethylaminoethyl)-5-m-methoxyphenyl-2-thiobarbituric acid, m.p. 235°–240°C.

The barbituric acid (5g) was dissolved in N hydrochloric acid (15.6 ml), the solution evaporated and the residue recrystallised from isopropanol-ether to give crystals of 5-(2'-dimethylaminoethyl)-5-m-methoxyphenyl-2-thiobarbituric acid hydrochloride, m.p. 150°C dec.

EXAMPLE 7

5-(2'-Dimethylaminoethyl)-5-M-Hydroxyphenyl-2-Thiobarbituric Acid and its Hydrochloride 5-(2'-Dimethylaminoethyl)-5-m-methoxyphenyl-2-thiobarbituric acid (6 g) obtained from Example 6 was dissolved in a mixture of glacial acetic acid (60 ml) and concentrated hydrobromic acid (18 ml), and the solution refluxed for 16 hours. The acids were evaporated off, the residue dissolved in water (20 ml) and the solution neutralized to a pH value of 8 by the addition of dilute ammonium hydroxide. The precipitated barbituric acid, m.p. 250°–252°C (d), was dissolved in N hydrochloric acid (11.4 ml), the solution evaporated, and the residue recrystallised from methanol-ether to give crystals of 5-(2'-dimethylaminoethyl)-5-m-hydroxyphenyl-2-thiobarbituric acid hydrochloride, m.p. 270°C (d).

EXAMPLE 8

5-(2'-Dimethylaminoethyl)-5-M-Methoxyphenylbarbituric Acid and its Hydrochloride 5-(2'-Dimethylaminoethyl)-5-(m-methoxyphenyl)-2-thiobarbituric acid (8 g) obtained from Example 6 was warmed with dilute nitric acid (2.5 N; 70 ml) until the evolution of nitrous fumes ceased. The hot solution was filtered to remove the sulphur and then allowed to cool. Crystals of 5-(2'-dimethylaminoethyl)-5-m-methoxyphenyl-barbituric acid nitrate separated out, m.p. 232°–233°C dec. A warm aqueous solution of the nitrate (7.5 g) was treated with ethanolic N-potassium hydroxide (20.4 ml). On cooling the free barbituric acid crystallised out, m.p. 212°–213°C.

The barbituric acid (3.5 g) was dissolved in N hydrochloric acid (11.5 ml), the solution evaporated and the product recrystallised from ethanol-ether to give 5-(2'-dimethylaminoethyl)-5-m-methoxyphenylbarbituric acid hydrochloride, m.p. 236°C dec.

EXAMPLE 9

5-(2'-Dimethylaminoethyl)-5-M-Hydroxyphenylbarbituric Acid Hydrobromide 5-(2'-Dimethylaminoethyl)-5-m-methoxyphenyl-barbituric acid (3.4 g) obtained from Example 8 was dissolved in a mixture of glacial acetic acid (30 ml) and concentrated hydrobromic acid (15 ml) and the mixture refluxed for 16 hours. The acids were evaporated off under reduced pressure and the crystalline residue recrystallised from ethanol-ether to give 5-(2'-dimethyl-aminoethyl)-5-m-hydroxyphenylbarbituric acid hydrobromide, m.p. 269°–271°C.

Found: C, 45.43; H, 4.94; N, 11.10; Br, 21.35%. $C_{14}H_{18}N_3O_4.HBr$. Requires: C, 45.19; H, 41.87; N, 11.29; Br, 21.47%.

EXAMPLE 10

5-(2'-Dimethylaminopropyl)-5-Phenyl-2-Thiobarbituric Acid and its Hydrobromide

Diethyl 2-phenylmalonate (118 g) was stirred with a suspension of sodium hydride (12.5 g) in dry dioxan (300 ml) at 25°–30°C until effervescence ceased. 1-Dimethylaminoisopropylchloride (60.8 g) was added dropwise to the solution at 90°C with constant stirring over a half hour period. After the addition was complete the mixture was stirred and refluxed for a further 16 hours and then allowed to cool. Ether (300 ml) and water (250 ml) were then added, and the ethereal layer separated and washed with dilute hydrochloric acid (200 ml; 2.5 N). Treatment of the acidic aqueous solution with 5N sodium hydroxide (100 ml) liberated an oil which was isolated by ether extraction. The oil distilled at 118°–130°C/0.07 mm. and consisted of a mixture of two isomeric basic malonates; 2(1'-methyl-2'-dimethylaminoethyl)-2-phenyl-diethyl-malonate and 2-(2'-dimethylaminopropyl)-2-phenyl-diethyl-malonate. These were separated by the following method.

A solution of the mixture of basic malonic esters (132.8 g) in ethanol (100 ml) was treated with a solution of oxalic acid dihydrate (52.1 g) in 200 ml of water and the solvents evaporated under reduced pressure. The syrupy residue was dissolved in hot methyl ethyl ketone and the solution allowed to cool when crystals of 2-(1'-methyl-2'-dimethylaminoethyl)-2-phenyl-diethyl-malonate hydrogen oxalate separated. The mother liquors were evaporated to give a syrupy residue of crude 2-(2'-dimethylaminopropyl)-2-phenyl-diethyl-malonate hydrogen oxalate. This was converted back to the base by treatment with 5N potassium hydroxide, the oil being isolated by ether extraction b.p. 116°–120°C (0.1 mm.), $n_D^{19}$ 1.4958.

The crystalline hydrogen oxalate was recrystallised from methyl ethyl ketone to give crystals, m.p.

144.6°C. These were dissolved in warm water, the solution basified with excess 5N potassium hydroxide and the malonic ester isolated by ether extraction, b.p. 121°–127°C/0.1 mm.

Finely powdered dry thiourea (13.5 g) was stirred with a solution of sodium (5.45 g) in anhydrous ethanol (170 ml) at room temperature until it had almost all dissolved. Diethyl 2-(2'-dimethylaminopropyl)-2-phenylmalonate (38 g) was then added with stirring during half an hour and the mixture allowed to stand overnight at room temperature. The ethanol was evaporated off using a rotary evaporator, the residue dissolved in ice-cold water (120 ml) and any oil removed by ether extraction. Neutralisation of the aqueous solution to pH8 with dilute acetic acid (5N) precipitated 5-(2'dimethylaminopropyl)-5-phenyl-2-thiobarbituric acid.

The thiobarbituric acid (11 g) was converted to its hydrobromide by dissolving it in N hydrobromic acid (36.3 ml), evaporating the solution to dryness, boiling the syrupy residue with acetone, and recrystallising the resulting solid from 2-ethoxyethanol to give 5-(2'-dimethylaminopropyl)-5-phenyl-2-thiobarbituric acid hydrobromide, m.p. 265°C dec.

Found: N, 10.87%. $C_{15}H_{20}N_3O_2SBr$. Requires: N, 10.85%.

EXAMPLE 11

5-(2'-Dimethylaminopropyl)-5-Phenylbarbituric Acid and its Hydrochloride 5-(2'-Dimethylaminopropyl)-5-phenyl-2-thiobarbituric acid (12 g) from Example 10 was warmed with 2.5 N nitric acid (100 ml) until evolution of nitrous fumes ceased. The hot solution was filtered to remove sulphur and allowed to cool. The pH of the solution was adjusted to 8 by the addition of dilute sodium hydroxide (2.5N), when crystals of 5-(2'-dimethylaminopropyl)-5-phenyl-barbituric acid, m.p. 213°–215°C separated out.

The barbituric acid was dissolved in N hydrochloric acid (20 ml), the solution evaporated and the residue recrystallised from ethanol-ether to give 5-(2'-dimethylaminopropyl)-5-phenylbarbituric acid hydrochloride, m.p. 285°C dec.

Found: C, 55.47; H, 6.18; N, 13.39%. $C_{15}H_{20}N_3O_3Cl$. Requires: C, 55.30; H, 6.19; N, 12.90%.

EXAMPLE 12

5-(2'Morpholinoethyl)-5-Phenyl-2-Thiobarbituric Acid and its Hydrochloride

Sodium (9.2 g) was dissolved in anhydrous ethanol (300 ml) and finely powdered dry thiourea (30.4 g) was added. The resulting solution was cooled to room temperature and diethyl 2(2'-morpholinoethyl)-2-phenyl-malonate (69.8g) added dropwise over half an hour with constant stirring. The mixture was stirred overnight at room temperature and the solution evaporated to dryness under reduced pressure. The residue was dissolved in ice cold water (200 ml), any oil removed by ether extraction and the clear aqueous solution neutralised to pH8 by the addition of dilute acetic acid (5N). The 5-(2'-morpholinoethyl)-5-phenyl-2-thiobarbituric acid was extracted with chloroform and a portion of the chloroform extract evaporated to give crystals of the thiobarbituric acid, m.p. 218°–221°C.

The remainder of the chloroform extract was treated with ethereal hydrogen chloride and the precipitate recrystallised from ethanol to give 5-(2'-morpholinoethyl)-5-phenyl-2-thiobarbituric acid hydrochloride, m.p. 266°–270°C dec.

Found: C, 52.21; H, 5.38; N, 11.32; S, 8.48; Cl, 9.46%. $C_{16}H_{19}O_3N_3S.HCl$. Requires: C, 51.95; H, 5.45; N, 11.36; S, 8.67; Cl, 9.58%.

EXAMPLE 13

5-(2'-Morpholinoethyl)-5-Phenylbarbituric Acid and its Hydrochloride 5-(2'-Morpholinoethyl)-5-phenyl-2-thiobarbituric acid (5 g) from Example 12 was warmed with dilute nitric acid (2.5 N; 60 ml) until the evolution of nitrous fumes ceased. The hot solution was filtered to remove sulphur and then allowed to cool. The pH of the solution was adjusted to 9 by the addition of 5N ammonium hydroxide when crystals of 5-(2'-morpholinoethyl)-5-phenylbarbituric acid, m.p. 260°–262°C, separated.

The barbituric acid (6.6 g) was dissolved in a mixture of 5N hydrochloric acid (5 ml), water (20 ml) and methanol (50 ml), the solution evaporated and the residue recrystallised from aqueous alcohol to give 5-(2'-morpholinoethyl)-5-phenylbarbituric acid hydrochloride, m.p. 280°–290°C dec.

Found: C, 54.38; H, 5.62; N, 12.3%. $C_{16}H_{19}O_4N_3.HCl$ requires: C, 54.31; H, 5.70; N, 11.9%.

EXAMPLE 14

5-(2'-Piperidinoethyl)-5-Phenyl-2-Thiobarbituric Acid and its Hydrochloride

Finely powdered dry thiourea (44.4 g) was added to a stirred solution of sodium (13.4 g) in anhydrous ethanol at room temperature and the mixture stirred until it had nearly all dissolved. Diethyl 2-(2'-piperidinoethyl)-2-phenylmalonate (101 g) was added with stirring during half an hour and the mixture then stirred at room temperature overnight. The solution was evaporated to dryness under reduced pressure, the residue dissolved in ice-cold water (250 ml) and any oil removed by ether extraction. The pH of the clear aqueous solution was adjusted to 9 by the addition of 5 N acetic acid and the precipitated 5-(2'-piperidinoethyl)-5-phenyl-2-thiobarbituric acid (m.p. 220°C) filtered off.

The barbituric acid (20 g) was dissolved in a mixture of 5N hydrochloric acid (13.5 ml) and water (100 ml), the solution evaporated and the residue recrystallised from ethanol-methylethylketone to give crystals of 5-(2'-piperidinoethyl)-5-phenyl-2-thiobarbituric acid hydrochloride, m.p. 267°–269°C dec.

Found: N, 11.00; S, 8.53; Cl, 9.41%. $C_{17}H_{21}O_2N_3S.HCl$ requires: N, 11.4; S, 8.71; Cl, 9.63%.

EXAMPLE 15

5-(2'-Piperidinoethyl)-5-phenylbarbituric acid and its hydrochloride 5-(2'-Piperidinoethyl)-5-phenyl-2-thiobarbituric acid (5 g) was warmed with dilute nitric acid (2.5N; 66 ml) until the evolution of nitrous fumes ceased. The hot solution was filtered, cooled and then treated with sufficient 5N ammonium hydroxide to lower the pH to 9 when crystals of 5-(2'-piperidinoethyl)-5-phenylbarbituric acid (m.p. 230°–234°C) separated.

A solution of the barbituric acid (14 g) in ethanol (50 ml) was treated with N hydrochloric acid (50 ml), the solvents evaporated off and the crystalline residue recrystallised from water to give 5-(2'-piperidinoethyl)-

5-phenylbarbituric acid hydrochloride, m.p. 316°–317°C dec.
Found: C, 58.35; H, 6.57; N, 12.25%. $C_{17}H_{21}N_3O_3.HCl$ requires: C, 58.03; H, 6.31; N, 11.95%

EXAMPLE 16

5-(2'-pyrrolidinoethyl)-5-phenyl-2-thiobarbituric acid and its hydrochloride

Diethyl 2-(2'-pyrrolidinoethyl)-2-phenylmalonate (67.1 g) was slowly added during half an hour to a stirred solution of sodium (9.3 g) and thiourea (30.3 g) in anhydrous ethanol (300 ml) at room temperature and the mixture then stirred at room temperature overnight. The ethanol was evaporated off at a temperature below 50°C under reduced pressure, the residue dissolved in ice-cold water (250 ml), the solution clarified by an extraction with ether and then neutralised to pH 8 by addition of 5N ammonium hydroxide. The crystals of 5-(2'-pyrrolidinoethyl)-5-phenyl-2-thiobarbituric acid (m.p. 221°–223°C dec.) were filtered off and dried.

The barbituric acid (20 g) was treated with 5N hydrochloric acid (15 ml) and methyl alcohol (100 ml), the solvents evaporated off and the residue crystallised from ethanol and then from ethanol-methyl ethylketone to give 5-(2'-pyrrolidinoethyl)-5-phenyl-2-thiobarbituric acid hydrochloride, m.p. 259°–261°C.
Found: C, 53.86; H, 5.52; N, 11.56%. $C_{16}H_{19}N_3O_2S.HCl$ requires: C, 54.30; H, 5.69; N, 11.85%.

EXAMPLE 17

5-(2'-pyrrolidinoethyl)-5-phenylbarbituric acid and its hydrochloride 5-(2'-pyrrolidinoethyl)-5-phenyl-2-thiobarbituric acid (20 g) from Example 16 was warmed with dilute nitric acid (2.5N; 250 ml) until the evolution of nitrous fumes ceased. The hot solution was filtered, cooled and the pH of the solution adjusted to 9 by the addition of 5N ammonium hydroxide, when crystals of 5-(2'-pyrrolidinoethyl)-5-phenylbarbituric acid (m.p. 245°C dec.) separated.

The barbituric acid (13.5 g) was dissolved in a mixture of 5N hydrochloric acid (10 ml) and methyl alcohol (50 ml), the solution evaporated to dryness and the residue recrystallised from ethanol and then from ethanol-methylethylketone to give 5-(2'-pyrrolidinoethyl)-5-phenylbarbituric acid hydrochloride, m.p. 288°–292°C dec.
Found: C, 57.25; H, 5.97; N, 12.44; Cl, 10.52%. $C_{16}H_{19}N_3O_3.HCl$ requires: C, 56.90; H, 5.97; N, 12.44; Cl, 10.50%.

EXAMPLE 18

5-(2'-Dimethylaminoethyl)-5-o-chlorophenyl-2-thiobarbituric acid and its hydrochloride Finely powdered dry thiourea (1.8 g) was added to a cool solution of sodium (2.96 g) in anhydrous ethanol (100 ml) and the mixture stirred until the thiourea had almost all dissolved. Diethyl 2-(2'-dimethylaminoethyl)-o-chlorophenylmalonate (22 g) was added dropwise to the stirred solution kept at room temperature over a half hour period. The mixture was finally stirred at room temperature overnight. The ethanol was evaporated off, using a rotary evaporator, the residue dissolved in ice water (100 ml) and the small quantity of undissolved oil removed by ether extraction. Neutralisation of the aqueous solution to pH8 by the addition of 5N ammonium hydroxide precipitated crystals of 5-(2'-dimethylaminoethyl)-5-o-chlorophenyl-2-thiobarbituric acid, m.p. 236°–238°C.

The barbituric acid (19 g) was dissolved in a warm mixture of 0.5 N hydrochloric acid (110 ml) and ethanol (110 ml). The crystals obtained on cooling were filtered off and the product recrystallised from aqueous alcohol (1:1) to give yellow needles of 5-(2'-dimethylaminoethyl)-5-o-chlorophenyl-2-thiobarbituric acid hydrochloride, m.p. 287°–288°C dec.
Found: C, 46.41; H, 5.02; N, 11.40; Cl, 19.62%. $C_{14}H_{17}N_3O_2SCl_2$ requires: C, 46.41; H, 4.73; N, 11.60; Cl, 19.57%.

EXAMPLE 19

5-(2'-dimethylaminoethyl)-5-phenylbarbituric acid and its hydrochloride

2-Phenyl diethyl malonate (55 g) was stirred with sodium hydride (5.7 g) in dry dioxan (150 mls) until effervescence ceased. The resulting clear solution of the sodio derivative was then heated to 80°C and 2-dimethylaminoethyl chloride (29 g) added dropwise with constant stirring over a half hour period. The mixture was finally refluxed and stirred for 3 hours and allowed to cool. Ether (200 mls) and water (200 mls) were then added, the ethereal layer separated and washed with dilute hydrochloric acid (100 mls., 2.5N). Treatment of the resulting acidic aqueous solution with 5N sodium hydroxide (50 mls) gave an oily layer which was isolated by ether extraction. Distillation afforded 2-(2'-dimethylaminoethyl)-2-phenyl diethyl malonate, b.p. 118°–124°C/0.01 mm.

2-(2'-Dimethylaminoethyl)-2-phenyl diethyl malonate (21 g) (prepared in the above manner) and urea (10 grams) were added to a solution of sodium (3.2 g) in anhydrous ethanol (100 mls) and the mixture refluxed for 16 hours. The ethanol was distilled off under reduced pressure and the residue dissolved in ice-water (120 mls). The resulting oily layer was extracted with ether and the remaining aqueous solution neutralised to a pH value of 8 by the addition of dilute acetic acid. The precipitated barbituric acid derivative (m.p. 248°–250°C) was dissolved in N hydrochloric acid (17.5 mls), the solution evaporated, and the product recrystallised from methanol-ether to give 5-(2'-dimethylaminoethyl)-5-phenylbarbituric acid hydrochloride, m.p. 284°–286°C.
Found: C, 52.88; H, 5.72; N, 13.8; Cl, 11.52%. $C_{14}H_{18}N_3O_3Cl$ requires: C, 53.92; H, 5.85; N, 13.55; Cl, 11.43%.

EXAMPLE 20

5-(2'-dimethylaminoethyl)-5-sec.amyl-2-thiobarbituric acid and its hydrochloride 2-(2'-Dimethylaminoethyl)-2-sec.amyl diethyl malonate (12 g) (prepared in a manner similar to that described in Example 19) and thiourea (4.6 g) were added to a solution of sodium (1.84 g) in anhydrous ethanol (60 mls) and the mixture refluxed for 16 hours. The ethanol was distilled off under reduced pressure and the residue dissolved in ice-water (60 mls). The resulting oily layer was extracted with ether and the remaining aqueous solution neutralised to a pH value of 8 by the addition of dilute acetic acid. The precipitated barbituric acid derivative, m.p. 208°–210°C (from aqueous ethanol) was dissolved in N hydrochloric acid (25 ml), the solution evaporated and the product recrystallised from ethanol-ether to give plates of 5-(2'-dimethylaminoethyl)-5-sec.amyl-2-thiobarbituric acid hydrochloride, m.p. 265°C dec.

Found: C, 48.57; H, 8.0; N, 13.0; S, 9.89; Cl, 11.0%. $C_{13}H_{23}O_2N_3S.HCl$ requires: C, 48.52; H, 7.52; N, 13.06; S, 9.96; Cl, 11.02%.

EXAMPLE 21

5-(1'-Methyl-2'-dimethylaminoethyl)-5-phenyl-2-thiobarbituric acid and its hydrobromide Diethyl 2-(1'-methyl-2'-dimethylaminoethyl)-2-phenylmalonate (17 g) (prepared and separated as in Example 10) and thiourea (8 g) were added to a solution of sodium (2.42 g) in anhydrous ethanol (80 ml) and the mixture refluxed for 16 hours. The ethanol was evaporated off, the residue dissolved in ice-cold water (70 ml) and the solution clarified by an extraction with ether. Neutralisation of the aqueous solution to pH8 by the addition of dilute acetic acid (5N) precipitated 5-(1'-methyl-2'-dimethylaminoethyl)-5-phenyl-2-thiobarbituric acid, m.p. 250°–253°C dec.

The barbituric acid (10 g) was dissolved in N hydrobromic acid (33 ml), the solution evaporated and the residue recrystallised from water to give 5-(1'-methyl-2'-dimethylaminoethyl)-5-phenyl-2-thiobarbituric acid hydrobromide mono hydrate, m.p. 265°–270°C.

Found: N, 10.54%. $C_{15}H_{20}N_3O_2SBr.H_2O$ requires: N, 10.40%.

EXAMPLE 22

5-(1'-Methyl-2'-dimethylaminoethyl)-5-phenylbarbituric acid and its hydrobromide Diethyl 2-(1'-methyl-2'-dimethylaminoethyl)-2-phenylmalonate (13.85 g)(prepared and separated as in Example 10) and urea (5.1 g) were added to a solution of sodium (1.98 g) in anhydrous ethanol (65 ml) and the mixture refluxed for 16 hours. The ethanol was evaporated off, the residue dissolved in ice-water (50 ml) and the solution clarified by an extraction with ether. Neutralisation of the aqueous solution to pH8 by the addition of 5N acetic acid precipitated 5-(1'-methyl-2'-dimethylaminoethyl)-5-phenylbarbituric acid, m.p. 218°–220°C after recrystallisation from hot water.

Found: C, 61.63; H, 6.64; N, 14.27%. $C_{15}H_{19}N_3O_3$ requires C, 62.26; H, 6.62; N, 14.52%.

A solution of the barbituric acid (8.5 g)) in N hydrobromic acid (29.4 ml) was evaporated to dryness and the residue recrystallised from acetone-ether to give crystals of 5-(1'-methyl-2'-dimethylaminoethyl)-5-phenylbarbituric acid hydrobromide, m.p. 260°C dec.

Found: C, 49.15; H, 5.06; N, 10.53%. $C_{15}H_{20}N_3O_3Br$ requires: C, 48.65; H, 5.45; N, 11.35%.

EXAMPLE 23

5-(2'-Dimethylaminoethyl)-5-n-butyl-2-thiobarbituric acid and its hydrochloride

Diethyl 2-(2'-dimethylaminoethyl)-2-n-butylmalonate (27.8 g) and thiourea (11 g) were added to a solution of sodium (4.46g) in anhydrous ethanol (100 ml) and the mixture refluxed for 18 hours. After cooling, cold water (300 ml) was added, the oily layer removed by an ether extraction, and the aqueous solution neutralised to pH8 by the addition of 5N acetic acid. The precipitated 5-(2'-dimethylaminoethyl)-5-n-butyl-2-thiobarbituric acid (m.p. 222°–224°C) was dissolved in N hydrochloric acid (50 ml), the solution evaporated and the product recrystallised from ethanol-ether to give 5-(2'-dimethylaminoethyl)-5-n-butyl-2-thiobarbituric acid hydrochloride, m.p. 262°–263°C.

Found: C, 53.07; H, 7.89; N, 15.6; S, 12.0%. $C_{12}H_{21}O_2N_3S$ requires: C, 53.11; H, 7.80; N, 15.50; S, 11.81%.

EXAMPLE 24

5-(2'-Piperidino-N-ethyl)-5-sec.amyl-2-thiobarbituric acid and its hydrochloride Diethyl 2-sec.amyl-2-(2'-piperidino-N-ethyl) malonate (18 g) and thiourea (6.1g) were added to a solution of sodium (2.43 g) in anhydrous ethanol (60 ml) and the mixture refluxed for 16 hours. After cooling the ethanol was distilled off under reduced pressure and the residue dissolved in ice cold water (120 ml). The oily layer was removed by ether extraction and the aqueous solution neutralised to pH8 by the addition of dilute hydrochloric acid. The precipitated 5-(2'-piperidino-N-ethyl)-5-sec.amyl-2-thiobarbituric acid was dissolved in one equivalent of N hydrochloric acid, the solution evaporated and the product recrystallised from acetone-ether to give 5-(2'-piperidino-N-ethyl)-5-sec.amyl-2-thiobarbituric acid hydrochloride monohydrate.

Found: C, 50.52; H, 8.56; S, 8.28; Cl, 9.18%. $C_{16}H_{28}N_3O_2SCl.H_2O$ requires: C, 50.58; H, 7.96; S, 8.44; Cl, 9.33%.

EXAMPLE 25

5-(2'-Diethylaminoethyl)-5-sec.amyl-2-thiobarbituric acid and its hydrochloride

Diethyl 2-sec.amyl-2-(2'-diethylaminoethyl) malonate (13 g) of thiourea (4.6 g) were added to a solution of sodium (1.84 g) in dry ethanol (40 ml) and the mixture refluxed for 18 hours. After cooling, water (100 ml) was added, the oily layer removed by an ether extraction, and the aqueous solution neutralised to pH7 by the addition of dilute hydrochloric acid. The precipitated 5-(2'-diethylaminoethyl)-5-sec.amyl-2-thiobarbituric acid was dissolved in N hydrochloric acid (14.4 ml), the solution evaporated and the product recrystallised from ethanol-ether to give 5-(2'-diethylaminoethyl)-5-sec.amyl-2-thiobarbituric acid hydrochloride, m.p. 247°–249°C.

Found: C, 51.35; H, 8.06; N, 11.83; S, 8.94; Cl, 9.8%. $C_{15}H_{28}N_3O_2SCl$ requires: C, 51.77; H, 8.07; N, 12.00; S, 9.16; Cl, 10.13%.

EXAMPLE 26

5-(2'-Dimethylaminoethyl)-5-phenyl-2-thiobarbituric acid and its hydrochloride

Diethyl 2-(2'-dimethylaminoethyl)-2-phenylmalonate (21 g) and thiourea (10.5. g) were added to a solution of sodium (3 g) in anhydrous ethanol (100 ml) and the mixture refluxed for 18 hours. After cooling, water (150 ml) was added, the oily layer removed by an ether extraction and the aqueous solution neutralised to pH8 by the addition of dilute acetic acid. The precipitated 5-(2'-dimethylaminoethyl)-5-phenyl-2-thiobarbituric acid (m.p. 240°C dec.) was dissolved in N hydrochloric acid (33.5 ml) the solution evaporated and the product recrystallised from water to give 5-(2'-dimethylaminoethyl)-5-phenyl-2-thiobarbituric acid hydrochloride m.p. 293°–294°C. dec.

Found: C, 50.63; H, 5.61; N, 13.12; S, 9.8; Cl, 11.0%. $C_{14}H_{17}N_3O_2S.HCl$ requires: C, 51.29; H, 5.57; N, 12.81; S, 9.78; Cl, 10.82%.

EXAMPLE 27

5-(2'-Dimethylaminoethyl)-5-cyclohexyl-2-thiobarbituric acid and its hydrochloride Diethyl 2-(2'-dimethylaminoethyl)-2-cyclohexyl malonate (22.9 g) and thiourea (11.1 g) were added to a solution of sodium (3.4 g) in anhydrous ethanol (250 ml) and the mixture refluxed for 16 hours. The ethanol was evaporated off under reduced pressure, the residue dissolved in ice-cold water (200 ml) and the oily layer removed by an ether extraction. Neutralisation of the clear aqueous solution to pH8 by the addition of 5N acetic acid precipitated 5-(2'-dimethylaminoethyl)-5-cyclohexyl-2-thiobarbituric acid m.p. 260°C dec.

The barbituric acid was dissolved in one equivalent of N hydrochloric acid, the solution evaporated and the residue recrystallised from ethanol to give 5-(2'-dimethylaminoethyl)-5-cyclohexyl-2-thiobarbituric acid hydrochloride, m.p. 282°C dec.

Found: N, 13.07%. $C_{14}H_{24}N_3O_2SCl$ requires: N, 12.75%.

EXAMPLE 28

5-(3'-Dimethylaminopropyl)-5-phenyl-2-thiobarbituric acid and its hydrochloride

Diethyl 2-(3'-dimethylaminopropyl)-2-phenylmalonate (21.4 g) and thiourea (10.1 g) were added to a solution of sodium (3.1 g) in anhydrous methanol (150 ml) and the mixture refluxed for 16 hours. The methanol was evaporated off under reduced pressure, the residue dissolved in ice water (100 ml) and the oily layer removed by an ether extraction. Neutralisation of the clear aqueous solution to pH 10 precipitated 5-(3'-dimethylaminopropyl)-5-phenyl-2-thiobarbituric acid, m.p. 253°–255°C dec.

The barbituric acid (13.5 g) was dissolved in a mixture of 5N hydrochloric acid (10 ml) and methyl alcohol (50 ml), the solution evaporated to dryness and the product recrystallised from ethanol-ether to give 5-(3'-dimethylaminopropyl)-5-phenyl-2-thiobarbituric acid hydrochloride, m.p. 253°C.

Found: C, 51.93; H, 5.93; N, 11.98%. $C_{15}H_{19}O_2N_3S.HCl$ requires: C, 52.6; H, 5.90; N, 12.29%.

EXAMPLE 29

5-(3'-Dimethylaminopropyl)-5-phenylbarbituric acid and its hydrochloride 5-(3'-Dimethylaminopropyl)-5-phenyl-2-thiobarbituric acid (13 g) from Example 28 was gently heated with 2.5 N nitric acid (162.5 ml) until the evolution of nitrous fumes ceased. The hot solution was filtered, cooled and neutralised by the addition of 5N ammonium hydroxide. The precipitated 5-(3'-dimethylaminopropyl)-5-phenyl-barbituric acid (m.p. 230°C) was filtered off and dissolved in an equivalent of N hydrochloric acid, the solution evaporated and the product recrystallised from aqueous ethanol to give 5-(3'-dimethylaminopropyl)-5-phenyl-barbituric acid hydrochloride m.p. 295°–296°C dec.

Found: C, 55.65; H, 6.12; N, 13.10; Cl. 11.21%. $C_{15}H_{19}O_3N_3.HCl$ requires: C, 55.29; H, 6.19; N, 12.90; Cl, 10.9%.

EXAMPLE 30

Tablet Formulation

Tablets each having the following composition were made up as described:

| | |
|---|---|
| 5-(2'-Piperidinylmethyl)-5-phenylbarbituric acid hydrochloride | 100 mg |
| Lactose | 228 mg |
| Maize starch | 70 mg |
| Ethylcellulose N.100 | 8 mg |
| Talc | 20 mg |
| Stearic acid | 4 mg |

The barbituric acid, lactose and a proportion of the starch (40 mg per tablet) were passed through a 40 mesh screen (British Standard Sieve) and mixed together. The mixed powders were massed with a solution of the ethylcellulose in isopropyl alcohol and the mass then granulated through a 12 mesh screen (B.S.S.). The granules were dried at 40°C and then passed through a 16 mesh screen (B.S.S.). Finally, the talc, stearic acid and remaining starch (all passed through a 60 B.S.S. mesh screen) were mixed with the granules and the mixture compressed into tablets each weighing 430 mg.

EXAMPLE 31

Capsule Formulation

Capsules each of the following composition were made as described:

| | |
|---|---|
| 5-(2'-Piperidinylmethyl)-5-phenylbarbituric acid hydrochloride. | 100 mg |
| Lactose | 25 mg |

The barbituric acid and lactone were passed through a 30 B.S.S. mesh screen and well mixed together. The mixed powders were filled into gelatin capsules so that each contained 125 mg of the mixture.

EXAMPLE 32

Suppository Formulation

Suppositories each having the specified composition were made up as described:

| | |
|---|---|
| 5-(2'-Piperidinylmethyl)-5-phenyl-barbituric acid hydrochloride | 100 mg |
| Oil of theobroma | 1 G |

The barbituric acid was passed through a 60 mesh B.S.S. screen and triturated with the molten oil of theobroma at 45°C to form a smooth suspension which was stirred well and poured into suppository moulds, each of a nominal 1G. capacity and left to cool to produce suppositories.

EXAMPLE 33

Injection Solutions and Sterile Powders Therefor

A sterile powder for the preparation of an injection solution of 5-(2'-piperidinylmethyl)-5-phenylbarbituric acid was prepared by sterilising the finely divided solid barbituric acid by contact with ethylene oxide. The sterilised material was then transferred aseptically in 100 mg quantities to sterile final containers which were then aseptically sealed.

When required for use this sterile powder may be dissolved in 10 mls of sterile normal saline solution for injection, conveniently by addition of the saline solution to the opened container.

EXAMPLE 34

Injection Solutions and Sterile Powders Therefor 5-(2'-Piperidinyl 5-phenylbarbituric acid hydrochloride was dissolved in distilled water to a concentration of 100 mg/10 ml. This solution was then filtered through a bacteria-proof filter and the filtrate transferred aseptically in 10 ml portions each into the sterile final containers which were then freeze-dried under aseptic conditions and aseptically sealed.

This packaged sterile powder may then be dissolved in 10 mls of sterile normal solution for injection when required for use.

EXAMPLE 35

Tablet Formulation

Tablets each having the following composition were made up as described:

| | |
|---|---|
| 5-(2'-piperidinylmethyl)-5-phenylbarbituric acid hydrochloride. | 100 mg |
| Lactose | 158 mg |
| Maize starch, dried | 50 mg |
| Polyvinylpyrrolidone | 8 mg |
| Talc | 20 mg |
| Stearic acid | 4 mg |

The barbituric acid, lactose and maize starch were passed through a 40 mesh B.S.S. screen and mixed together. The mixed powders were massed with a solution of the polyvinylpyrrolidone in isopropyl alcohol and the mass granulated through a 12 mesh B.S.S. screen. The granules were dried at 40°C and then passed through a 16 mesh B.S.S. screen. Finally the talc and stearic acid are added to the granules and the mixture compressed into tablets each weighing 340 mg.

EXAMPLE 36

Injection Solutions 5-(2'-Diethylaminoethyl)-5-phenyl-2-thiobarbituric acid hydrochloride is dissolved in normal saline solution for injection to a concentration of 10 mg/ml. This solution is filtered through a bacteria-proof filter and transferred aseptically to sterilised glass ampoules in 1 ml quantities each, which are then sealed aseptically. Each ampoule thus contains a 10 mg dose.

50 mg and 100 mg dose ampoules may be made in like fashion by dissolving the barbituric acid in the saline solution to a concentration of 50 mg/ml or 100 mg/ml.

EXAMPLE 37

Injection Suspension

An oily suspension for injection purposes having the following composition:

| | |
|---|---|
| 5-(2'-Diethylaminoethyl)-5-phenyl-barbituric acid hydrochloride | 200 mg |
| Aluminium monostearate | 40 mg |
| Arachis oil | to 1 ml | is made by dissolving the aluminium monostearate in the arachis oil by heating. The resulting solution is triturated with the barbituric acid and the suspension obtained passed through a colloid mill. The suspension is then filled into clean and dried glass ampoules which were thereafter sealed by fusion of the glass. The ampoules of the suspension were finally sterilised by heating at 150°C for 1 hour.

EXAMPLE 38

Tablet Formulation

Tablets each having the following composition were made up as described below:

| | |
|---|---|
| 5-(N-methyl-2'-piperidinylmethyl)-5-phenyl-2-thiobarbituric acid hydrochloride | 100 mg |
| Lactose | 240 mg |
| Maize starch, dried | 76 mg |
| Talc | 10 mg |
| Stearic acid | 4 mg |

The lactose and a proportion of the maize starch (64 mg/tablet) were passed through a 40 mesh B.S.S. screen and well mixed together. The mixed powders were massed with a 1 in 10 starch paste prepared from the remainder of the maize starch (8 mg/tablet) and water. The mass was granulated through a 12 mesh B.S.S. screen and the granules dried at 40°C. The dried granules were then regranulated through a 16 mesh B.S.S. screen.

The thiobarbituric acid compound was passed through a 16 mesh B.S.S. screen and added to the prepared lactose/starch granules. Stearic acid (2 mg/tablet) and talc (5 mg/tablet) both passed through a 60 mesh B.S.S. screen, were also added to the granule mixture and the latter then compressed into slugs. These slugs were broken down through a 12 mesh B.S.S. screen, mixed with the remaining stearic acid (2 mg/tablet) and talc (5 mg/tablet)) and finally compressed into tablets so that each weighed 430 mg.

EXAMPLE 39

Tablet Formulation

Tablets each having the following composition were made up as described below:

| | |
|---|---|
| 5-(N-methyl-2'-piperidinylmethyl)-5-phenyl-2-thiobarbituric acid hydrochloride | 250 mg |
| Lactose | 325 mg |
| Maize starch, dried | 92 mg |
| Talc | 16 mg |
| Stearic acid | 7 mg |

The lactose and a proportion of the maize starch (81 mg/tablet) were passed through a 40 mesh B.S.S. screen and well mixed together. The mixed powders were massed with a 1 in 10 starch paste prepared from the remainder of the maize starch (11 mg/tablet) and water. The mass was granulated through a 12 mesh B.S.S. screen and the granules dried at 40°C. The dried granules were then regranulated through a 16 mesh B.S.S. screen.

The thiobarbituric acid compound was passed through a 16 mesh B.S.S. screen and added to the prepared lactose/starch granules. Stearic acid (3.5 mg/tablet) and talc (8 mg/tablet), both passed through a 60 mesh screen, were also added to the granule mixture and the latter then compressed into slugs. These slugs were broken down through a 12 mesh B.S.S. screen, mixed with the remainder of the stearic acid and talc and compressed finally into tablets so that each weighed 690 mg.

EXAMPLE 40

Tablet Formulation

Tablets each having the following composition were made up as described below:

| | |
|---|---|
| 5-(2'-Dimethylaminoethyl)-5-cyclohexyl-2-thiobarbituric acid hydrochloride | 250 mg |
| Lactose | 293 mg |
| Maize starch, dried | 80 mg |
| Ethylcellulose, N.100 | 12 mg |
| Talc | 30 mg |
| Stearic acid | 5 mg |

The thiobarbituric acid, lactose and a proportion of the starch (50 mg/tablet) were passed through a 40 mesh B.S.S. screen and mixed together. The mixed powders were massed with a solution of the ethylcellulose in isopropyl alcohol and the mass granulated through a 12 mesh B.S.S. screen. The granules were dried at 40°C and then passed through a 16 mesh B.S.S. screen. Finally the talc, the stearic acid and the balance of the starch (all passed through a 60 mesh B.S.S. screen) were added to the granules and the mixture compressed into tablets each weighing 670 mg.

EXAMPLE 41

Tablets each having the following composition were made up as described below:

| | |
|---|---|
| 5-(2'-Diethylaminoethyl)-5-phenylbarbituric acid hydrochloride. | 50 mg |
| Lactose | 129 mg |
| Maize starch, dried | 35 mg |
| Ethylcellulose, N.100 | 4 mg |
| Talc | 10 mg |
| Stearic acid | 2 mg |

The barbituric acid, lactose and a proportion of the maize starch (20 mg/tablet) were passed through a 40 mesh B.S.S. screen and mixed together. The mixed powders wer massed with a solution of the ethylcellulose in isopropylalcohol and the mass granulated through a 12 mesh B.S.S. screen. The granules were dried at 40°C and then passed through a 16 mesh B.S.S. screen. Finally the talc, stearic acid and balance of the starch (all passed through a 60 mesh B.S.S. screen) were added to the granules and the mixture compressed into tablets each weighing 230 mg.

We claim:

1. A method of ameliorating symptoms of paralysis agitans comprising administering to a subject exhibiting the syndrome thereof an effective dose of a compound having anti-Parkinsonism activity selected from the group consisting of a compound of the formula

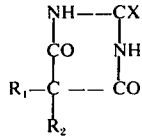

and a pharmaceutically acceptable salt thereof, in which formula X is selected from the group consisting of oxygen and sulphur, $R_1$ is selected from the group consisting of:

A. 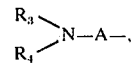

wherein $R_3$ and $R_4$ are selected from the group consisting of methyl and ethyl, and A is selected from the group consisting of 2-ethylene and 3-propylene;

B. B⟩N—A—, wherein B⟩N— is selected from the group consisting of pyrrolidino, piperidino, morpholino, piperazino and homopiperazino, and A is selected from the group consisting of 2-ethylene and 3-propylene; and C. 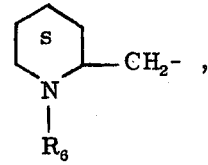

wherein $R_6$ is selected from the group consisting of hydrogen and methyl; and $R_2$ is phenyl.

2. A method as claimed in claim 1, wherein $R_1$ is selected from the class consisting of 2'-diethylaminoethyl, 2'-piperidinylmethyl and N-methyl-2'-piperidinylmethyl.

3. A method as claimed in claim 2, wherein X is oxygen, and $R_1$ is 2'-piperidinylmethyl.

4. A method as claimed in claim 1, wherein X is oxygen, and $R_1$ is 2'-piperidinylmethyl.

5. A method as claimed in claim 4 wherein the compound is in acid addition salt form.

6. A method as claimed in claim 5 wherein the acid addition salt is in hydrochloride salt form.

7. A method as claimed in claim 1, wherein X is sulphur, and $R_1$ is N-methyl-2'-piperidinylmethyl.

8. A method as claimed in claim 1, wherein X is oxygen and $R_1$ is 2'-diethylaminoethyl.

9. A method as claimed in claim 1, wherein X is sulphur, and $R_1$ is 2'-diethylaminoethyl.

10. A method of ameliorating paralysis agitans comprising administering to a subject exhibiting the syndrome thereof an effective dose of 5-cyclohexyl-5-(2'-dimethylaminoethyl)-2-thiobarbituric acid compound.

11. A pharmaceutical composition in dosage unit form, for ameliorating symptoms of paralysis agitans, comprising a pharmaceutical carrier and an effective amount of a compound having anti-Parkinsonism activity selected from the group consisting of a compound of the formula:

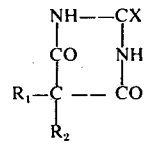

and a pharmaceutically acceptable salt thereof, in which formula X is selected from the group consisting of oxygen and sulphur, $R_1$ is selected from the group consisting of:

A.

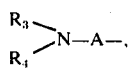

wherein $R_3$ and $R_4$ are selected from the group consisting of methyl and ethyl, and A is selected from the group consisting of 2-ethylene and 3-propylene;

B. B  N—A—, wherein B  N— is selected from the group consisting of pyrrolidino, piperidino, morpholino, piperazino and homopiperazino, and A is selected from the group consisting of 2-ethylene and 3-propylene; and C. 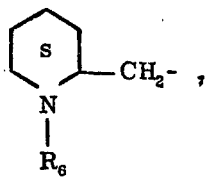

wherein $R_6$ is selected from the group consisting of hydrogen and methyl; and
$R_2$ is phenyl.

12. A pharmaceutical composition as claimed in claim 11, wherein $R_1$ is selected from the class consisting of 2'-diethylaminoethyl, 2'-piperidinylmethyl and N-methyl-2'-piperidinylmethyl.

13. A pharmaceutical composition as claimed in claim 12, wherein X is oxygen.

14. A pharmaceutical composition as claimed in claim 11, wherein X is oxygen and $R_1$ is 2'-piperidinylmethyl.

15. A pharmaceutical composition as claimed in claim 14, in acid addition salt form.

16. A pharmaceutical composition as claimed in claim 15, in hydrochloride salt form.

17. A pharmaceutical composition as claimed in claim 11, wherein X is sulphur and $R_1$ is N-methyl-2'-piperidinylmethyl.

18. A pharmaceutical composition as claimed in claim 11, wherein X is oxygen, and $R_1$ is 2'-diethylaminoethyl.

19. A pharmaceutical composition as claimed in claim 11, wherein X is sulphur and $R_1$ is 2'-diethylaminoethyl.

20. A pharmaceutical composition in dosage unit form, for ameliorating symptoms of paralysis agitans, comprising a pharmaceutical carrier and an effective amount of 5-cyclohexyl-5-(2'-dimethylaminoethyl)-2-thiobarbituric acid compound.

* * * * *